United States Patent [19]

Bradford

[11] 4,089,462
[45] May 16, 1978

[54] TEMPERATURE CONTROL SYSTEM INCLUDING K-FACTOR ADJUSTMENT

[75] Inventor: George J. Bradford, York, Pa.

[73] Assignee: International Telephone & Telegraph Corporation, Nutley, N.J.

[21] Appl. No.: 659,399

[22] Filed: Feb. 19, 1976

[51] Int. Cl.² ........................................... G05D 23/30
[52] U.S. Cl. ............................... 236/68 B; 236/91 R; 165/28
[58] Field of Search ................ 236/91 D, 91 E, 91 G, 236/91 R, 68 B, 1 R; 165/28; 219/497, 499, 501; 73/362 AR; 307/117

[56] References Cited

U.S. PATENT DOCUMENTS

| | | | |
|---|---|---|---|
| 2,431,790 | 12/1947 | Crosthwait et al. | 236/91 E |
| 3,054,562 | 9/1962 | Werts | 236/916 |
| 3,946,200 | 3/1976 | Juodikis | 219/499 |
| 3,964,676 | 6/1976 | Rooks et al. | 236/46 R |
| 3,979,059 | 9/1976 | Davis | 236/46 R |

Primary Examiner—William E. Wayner
Attorney, Agent, or Firm—John T. O'Halloran; Peter C. Van Der Sluys

[57] ABSTRACT

A temperature control system having heating and cooling means is provided with a means for automatically shifting the temperature control point in accordance with the outdoor ambient temperature and the K-Factor of the room in which the temperature control system is operating. Means are provided for modifying a signal corresponding to the outdoor ambient temperature in accordance with the K-Factor of the room and the modified signal is used to shift the control point so that room temperature changes caused by heat transfer through the walls are prevented by providing additional heating or cooling to compensate for such transfer without the need for adjusting the set point of the temperature control system. The K-Factor adjustment is made during installation of the temperature control system and is set in accordance with the K-Factor provided by the building architect.

22 Claims, 3 Drawing Figures

TEMPERATURE CONTROL SYSTEM INCLUDING K-FACTOR ADJUSTMENT

BACKGROUND OF THE INVENTION

1. Field of the Invention

The present invention relates to temperature control systems and more particularly to a system having a means for shifting the temperature control point in accordance with outdoor ambient temperature and the K-Factor of the room.

2. Description of the Prior Art

It is well known in the fields of heating, ventilating and air-conditioning that the number of BTU's required to maintain a room at a particular temperature is proportional to the difference between indoor and outdoor temperatures and a factor known as the K-Factor. The BTU's required to maintain a particular temperature may be expressed as: $BTU = K(T_{indoor} - T_{outdoor})$ where the K is the overall heat transfer coefficient expressed in units of ($BTU/Hr. Ft^2 \,°\, F$). This factor usually has a value in the range of 0.1 to 1.2 for a room and is calculated by the architect for each room of a building. Thus, the BTU's required to maintain a particular room temperature is directly related to the heat transferred through the walls, windows, etc. of the room and will vary considerably from room to room. A more generalized equation would include the effects of heat transfer through interior surfaces, internal heat gain due to people, lights and equipment and also temperature changes caused by air leakages through the room surfaces and fresh air introduced into the room by ventilating equipment.

Prior art devices have attempted to introduce a control signal corresponding to the outdoor air temperature into the temperature control system to compensate for heat transfer through the walls of the building. However, the amount of adjustment required to compensate for the heat transfer was never accurately known and was usually introduced into the system based on average requirements on a compromise basis.

In prior art devices such as home heating thermostats, there is no compensation for heat loss caused by reduced outdoor temperature and the occupant usually shifts the thermostat set point upwardly to avoid becoming chilled. This type of manual compensation is not practical for use in public buildings where the set point must be fixed.

An an example, in prior art devices the temperature of the room usually had to drop by 2½° to the temperature control point before full heating was called for. This was not a particular problem when a 72° heat set point was used since the full heat would be provided when the temperature dropped to a control point temperature of 69½° which is within the comfort range of most occupants. However, with the advent of the energy crisis and the emphasis being placed on energy conservation, it has become mandatory that the heat set point be reduced to 68° in many buildings. When the heat set point is set at 68°, the room temperature must drop to a control point temperature of 65½° before full heat is called for. A temperature of 65½° is below the comfort range for most persons and will be unacceptable. Thus, it is apparent that the prior art devices without compensation for heat transfer through the walls of the building are unsatisfactory when using a 68° heat set point.

In like manner, the cooling set point has been removed upwardly in most public buildings and the heat entering the room through the walls can raise the inside temperature to a very uncomfortable level unless compensation is provided that calls for cooling to prevent an undue increase in room temperature due to heat transfer through the walls.

It is apparent that when a compromise solution is used that provides compensation based only on outdoor temperature, excess heating or cooling will be called for in rooms where only a small amount of heat is transferred through the walls and in like manner insufficient heating or cooling will be supplied to rooms where there is excessive transfer of heat through the walls. The net result being that certain rooms will be uncomfortable, while other rooms will consume energy unnecessarily.

SUMMARY OF THE INVENTION

The present invention contemplates a temperature control system for a room that prevents room temperature changes or droop caused by heat transfer through the walls of the room as a result of the difference between outdoor and room temperatures. More particularly, the system contemplates the shifting of the temperature control point in accordance with outdoor temperature and the K-Factor for the particular room. The temperature control point is defined as the actual temperature at which a temperature control signal calling for heating or cooling is initiated, while the temperature set point is defined as the desired room temperature that is selected at the room thermostat. In most temperature control systems, the room temperature must vary by a predetermined differential from the temperature set point before heating or cooling is called for, the temperature at which heating or cooling is called for is referred to as the temperature control point. Each controller is provided with a K-Factor adjusting means so that the controller may be adjusted to exactly match the heat transfer characteristics of a room. Each adjusting means has a dial calibrated in K-Factor units from 0.1 to 1.2, and the K-Factor is provided by the building architect or mechanical engineer for each room of the building. Thus, the particular compensation required for each room may be easily adjusted by a mechanic during installation of the system.

The present invention may be practiced in simple embodiments for use with heating or cooling systems or in more complex embodiments for use with heating and cooling systems. It is also contemplated that the invention may be used to not only compensate for heat transfer through the walls of the building, but also to prevent temperature changes caused by the introduction of a variable volume of outside ventilation air. The volume of outside ventilation air brought into a room will depend upon local ventilation codes, and an adjustment similar to the K-Factor adjustment may be provided to adjust the system for the local minimum required.

The primary objective of the present invention is to prevent room temperature changes as a result of outdoor-indoor temperature differentials.

Another objective of the present invention is to provide a means for shifting the control point of a temperature control system to compensate for heat transfer through the walls of a building.

Another objective of the present invention is to provide compensation for heat transfer through the walls of a building, taking into consideration the outdoor air temperature and the K-Factor of the room.

Another objective of the present invention is to provide an adjustment means on a unit controller so that the controller may be exactly matched to the insulation characteristics of a particular room.

Another objective of the present invention is to provide a means for tailoring a control system to a particular room so that a minimum amount of energy is consumed while maintaining the room within the comfort range of the occupants.

Other objectives and advantages will appear in the following description which, when considered in conjunction with the accompanying drawings, sets forth three embodiments of the invention.

DESCRIPTION OF THE INVENTION

Figure 1:
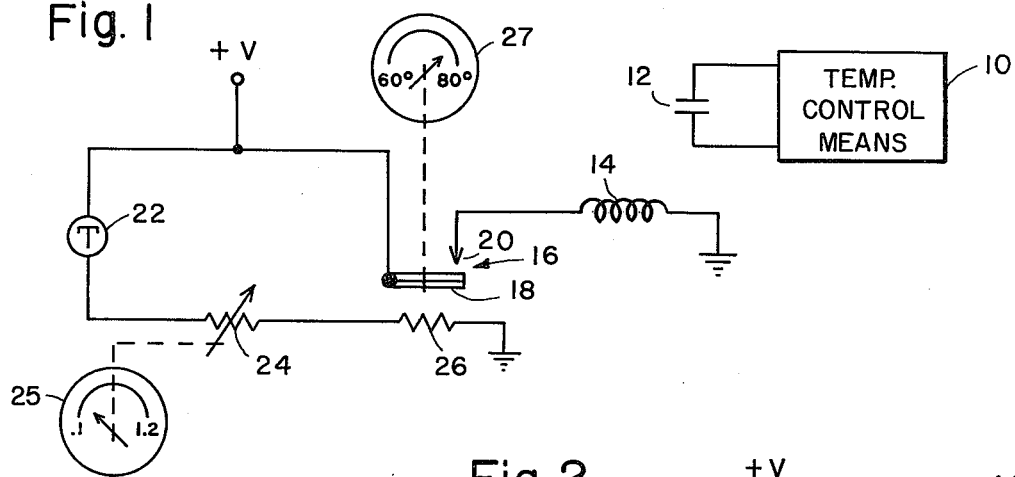
FIG. 1 is a schematic representation of the present invention in a simplified embodiment.

Referring to FIG. 1, there is shown a simplified embodiment of the present invention used for controlling a temperature control means 10 such as a heating system. The temperature control means 10 is activated by the closing of a pair of contacts 12, which are controlled by a relay coil 14. Relay coil 14 is connected at one end to ground and at the other end to a voltage source +V through a bimetallic switch 16. Bimetallic switch 16 includes a bimetal member 18 and a contact means 20. When designed for controlling a heating system, the free end of the bimetal member 18 will have a tendency to move upwardly and make contact with contact means 20 when subjected to a lowering temperature. The bimetallic switch 16 is located in the room to be controlled by the temperature control means so that when the room temperature drops, the bimetal member 18 bends, making contact with contact means 20, causing relay coil 14 to be energized by the voltage +V. The energized coil causes contacts 12 to close and thereby turn on the temperature control means to provide heat for the room. Should it be desired to use the bimetallic switch 16 for controlling a cooling means, the bimetal member 18 would have the bimetals reversed so that the free end moves upwardly upon a rise in temperature or alternatively, the contact means 20 could be positioned beneath the bimetal member 18.

To provide compensation for the effects of outdoor temperature and the resulting heat loss through the walls of the room, a temperature sensor 22, which may be a thermistor having a negative temperature coefficient, is disposed in series with a variable resistor 24 and a heating resistor 26. Said series connection being disposed between the voltage +V and ground to provide a current flow therethrough. The temperature sensor 22 is physically located outdoors to sense the outdoor ambient temperature, while the heater resistor 26 is located in proximity with the bimetal member 18 to heat said member. The variable resistance 24 has associated therewith a calibrated dial 25 with K-Factor units inscribed thereon from 0.1 to 1.2

In operation, the variable resistor 24 is adjusted to the K-Factor for the particular room as provided by the building architect. The bimetal member is positioned to a desired heat set point by an adjustment means 27. When the room temperature is at the heat set point, the bimetal member does not make contact with contact means 20. The bimetal member 18 is under the influence of both the room temperature and the heat being provided by the heating resistor 26. If the outdoor air temperature should drop, the resistance of temperature sensor 22 will increase causing a reduced current flow through heating resistor 26, so that the heating resistor provides less heat to the bimetal member 18, thereby causing the member to move upwardly and contact contact means 20. Relay coil 14 is then activated and contacts 12 close causing the production of heat from the temperature control means 10 to compensate for increased heat loss through the walls of the building as a result of the decreased outdoor temperature. The variable resistor 24 modifies the control exerted by temperature sensor 22 to correspond to the insulation qualities of the room as expressed in the K-Factor.

In like manner, when the system shown in FIG. 1 is used for controlling a cooling means and the outdoor temperature experiences a significant temperature increase, the resistance of temperature sensor 22 will decrease, causing an increased current flow through heating resistor 26, which would increase the heat supplied to bimetal member 18 simulating a rise in room temperature and initiating the energization of the cooling means.

The embodiment of FIG. 1 has been described using a thermistor for the temperature sensor; however, it is to be understood that other types of temperature sensors could readily be used with the present invention. Sensors that provide a variable resistance corresponding to the sensed temperature or active solid state temperature sensors that provide a voltage or current output corresponding to temperature could be used in place of sensor 22.

In a combined heating and cooling system, the bimetallic switch 16 could be provided with a pair of contacts 20 positioned on each side of the bimetal member 18 to make contact upon a predetermined increase in room temperature or upon a predetermined decrease in room temperature from the set point.

Figure 2:
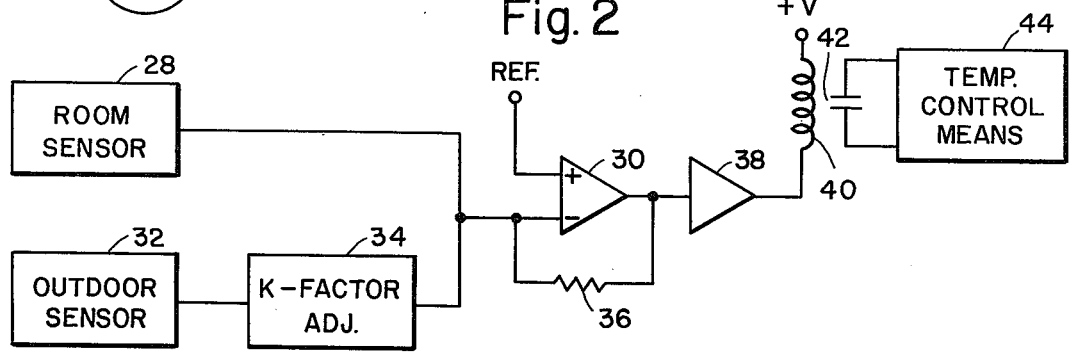
FIG. 2 is a block diagram of a more sophisticated embodiment of the present invention.

Referring to FIG. 2, there is shown a more sophisticated embodiment of the present invention wherein electronic temperature sensors may be utilized and the bimetal member eliminated. A room sensor 28 of the type that provides a voltage or current output corresponding to the difference between the actual room temperature and the room set point temperature is positioned in the room to be controlled and has an output connected to the inverting input of an amplifier 30. Amplifier 30 may be a standard operational amplifier and has a non-inverting input connected to a reference potential which may be zero volts. An outdoor sensor 32 of the type that provides a voltage or current signal corresponding to outdoor temperature has an output connected to an input of a K-Factor adjustment means 34. The K-Factor adjustment means modifies the signal of sensor 32 in accordance with the insulation quality of the room in which the room sensor is located, said insulation quality being defined by the K-Factor for the particular room. The K-Factor adjustment means 34 has an output which is also connected to the inverting input of amplifier 30. Negative feedback is provided for amplifier 30 by resistor 36 connected between the output of the amplifier and the inverting input. A trigger and driver amplifier 38 is connected to the output of amplifier 30 and has an output that switches from a high to a low voltage when the output signal from amplifier 30 goes lower than zero volts. A relay coil 40 is connected between a positive voltage source +V and the output of amplifier 38 and is energized when the amplifier output switches to a low voltage. Contacts 42 are controlled by the relay coil 40 and close when the relay coil is energized, thereby energizing a temperature control means 44, which may be a heating or cooling means. Relay coil 40 should be part of a sensitive lower power relay that may be operated by the rated output of amplifier 38. The relay could also be replaced by a solid state switch.

Concerning the operation of the device as shown in FIG. 2, first disregard the outdoor sensor 32 and consider a steady state condition wherein the room temperature is at or above the heat set point so that the output from the room sensor 28 is zero volts, which will provide a zero voltage output at amplifier 30, causing the output of amplifier 38 to be high and the relay coil 40 remains unenergized. Should the room temperature fall, the signal from the room sensor 28 will increase, thereby causing a drop in the output voltage from amplifier 30 to a level below zero volts, at which level the amplifier 38 will trigger and turn on the relay coil 40, causing contacts 42 to close and the temperature control means to provide heat. Thus, by providing an increased signal at the inverting input of amplifier 30, heat is turned on. Assuming now that the outdoor sensor 32 is connected and that the outdoor temperature differs from the desired heat set point, a certain amount of heat will be lost by transfer through the walls of the room. To compensate for this loss, it is desirable that the temperature control means be energized to provide an amount of heat corresponding to the amount lost through the walls. The outdoor sensor 32 provides a signal that increases as the outdoor temperature drops. This signal is modified by the K-Factor adjustment means 34 and is then applied to the inverting input of amplifier 30, which causes the output of amplifier 30 to drop below zero volts and thereby energize the relay and the temperature control means 44 to provide heat to compensate for the heat being lost through the walls so that the room temperature does not drop. Thus, the actual temperature control point for the room has been shifted upwardly to compensate for heat loss while the actual heat set point of the room sensor 28 remains the same.

Figure 3:
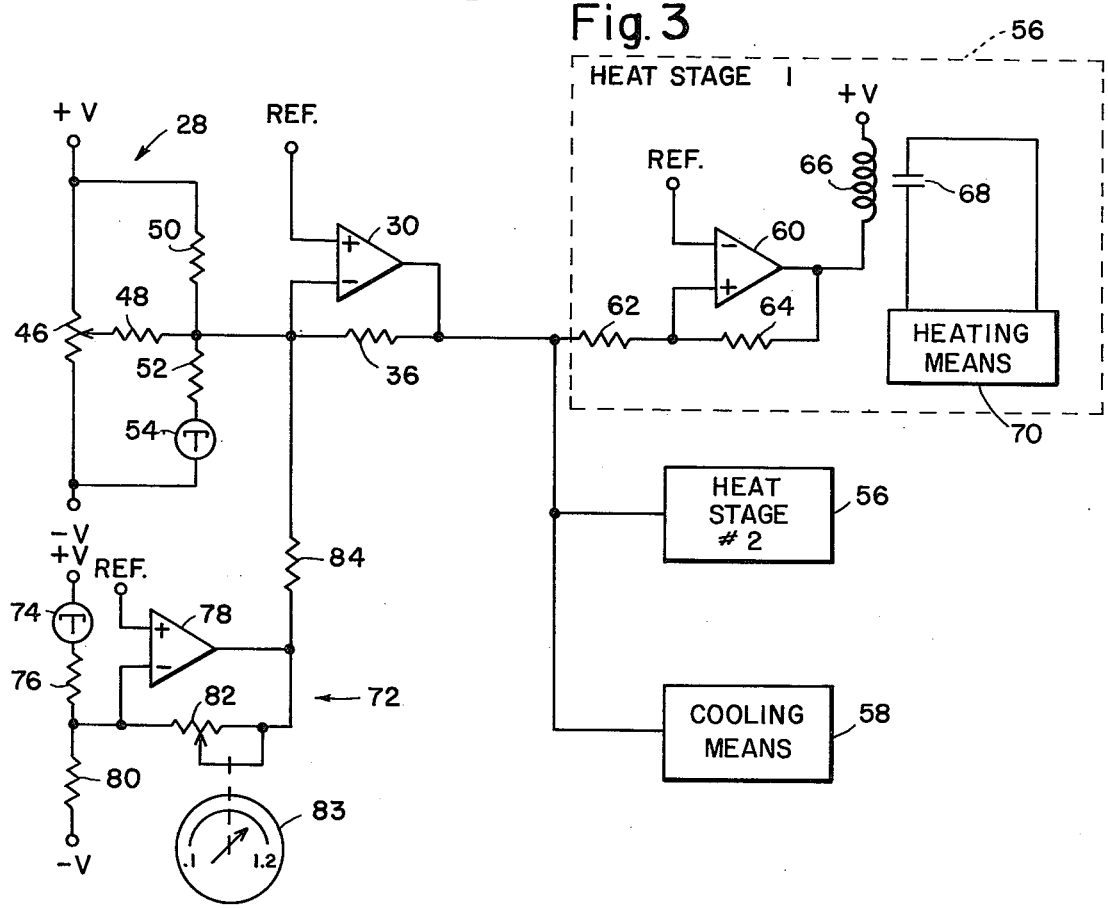
FIG. 3 is a schematic diagram of a preferred embodiment of the present invention.

Referring now to the detailed embodiment shown in FIG. 3, there is shown a room sensor 28 comprising an adjustable potentiometer 46 at which the heat set point for the room may be adjusted. The potentiometer 46 is connected between a positive and negative voltage supply designated as +V and −V in FIG. 3. The positive and negative voltage supplies may be any convenient voltage levels but are usually within the range of 5 to 15 volts. The slider of potentiometer 46 is connected to the inverting input of an operational amplifier 30 through a resistor 48, while the positive voltage supply is connected to the inverting input through a resistor 50. A series connected resistor 52 and temperature sensor 54 are connected between the inverting input of amplifier 30 and the negative power supply. Temperature sensor 54 is disposed within the room to be controlled and may be a negative temperature coefficient thermistor similar to thermistor 22 shown in FIG. 1. However, it is to be understood that while a thermistor is used for convenience, any variable resistor temperature sensor or other active device that provides a voltage or current output corresponding to temperature could be used in place of sensor 54. The non-inverting input of amplifier 30 is connected to a reference voltage which may be zero volts for convenience. The output of amplifier 30 is connected back to the inverting input through a feedback resistor 36.

When the proper selection of resistors 48, 50, 52 and the temperature sensor 54 is made, the voltage at the output of amplifier 30 will be zero volts when the actual room temperature exactly matches the temperature set point on potentiometer 46. As the room temperature falls, the resistance of the temperature sensor 54 increases, causing the current flow through resistor 52 and sensor 54 to decrease, causing an imbalance of the currents at the inverting input of amplifier 30. Since the sum of the currents at the inverting input of amplifier 30 must always equal zero, the voltage output from amplifier 30 drops to reduce the feedback current through resistor 36.

The output of amplifier 30 is preferably connected to a number of heat stages 56 and a cooling stage 58 of a temperature control system. Referring now to heat stage #1, the output of amplifier 30 is connected to a non-inverting input of an amplifier 60, which may also be a standard operational amplifier, through a resistor 62. The inverting input of amplifier 60 is connected to a reference signal which may be for convenience zero volts. A feedback resistor 64 is connected between the output of amplifier 60 and the non-inverting input. A low power sensitive relay coil 66 is connected between a positive voltage supply +V and the output of amplifier 60 for controlling a pair of relay contacts 66 which, when closed, energize a heating means 70 which may be any standard form of heating means such as an electrical heater or gas fired heater.

As previously discussed, the output of amplifier 30 drops below zero when the room temperature, as sensed by sensor 54, decreases. This output voltage is connected to the non-inverting input of amplifier 60 which causes the output of amplifier 60 to drop to a low level, thereby energizing coil 66 and closing the contacts 68 of the relay and causing heat to be supplied by the heating means 70.

Heat stage #2 has similar circuitry to that of heat stage #1 except that the threshold of amplifier 60 would be different so that a larger signal from amplifier 30 would be required before the heat stage is energized. This may be accomplished by adjusting the reference voltage level.

In like manner, a rise in room temperature will cause an increase in the output voltage from amplifier 30 to a level above zero volts, which may be sensed by the cooling means 58 to provide cooling through an air-conditioning system. It is contemplated that the cooling means would have circuitry contained therein similar to the circuitry shown in heating stage 1 modified to the extent that it would be responsive to a positive voltage rather than a negative voltage which may be accomplished by connecting the signal to the inverting input of amplifier 60. It may also be desirable in the cooling means circuitry to vary the reference voltage to some other level than zero volts, thereby providing a dead band where neither heating nor cooling would be provided.

To provide compensation for heat transfer through the walls of the room due to outdoor temperature differentials, compensating circuitry 72 has been provided and includes a temperature sensor 74 which may be a negative temperature coefficient thermistor as previously described or an active element that provides a voltage or current output corresponding to sensed temperature. Temperature sensor 74 is disposed outdoors for sensing the outdoor temperature. Temperature sensor 74 is connected in series with a resistor 76 and the series connection is disposed between a positive potential +V and an inverting input of an operational amplifier 78, which may be a standard operational amplifier. The non-inverting input of the amplifier 78 is connected to a reference signal which may be zero volts. The inverting input of amplifier 78 is also connected to a negative power supply −V through a resistor 80. Amplifier 78 is provided with negative feedback through a variable resistor 82 connected between the output of amplifier 78 and the inverting input. The output of amplifier 78 is also connected to the inverting input of amplifier 30 through a resistor 84. Variable resistor 82 has an adjustment means associated with a dial 83 calibrated in K-Factor units.

Through the proper selection of a temperature sensor 74 and resistors 76 and 80, an imbalance of current at the inverting input of amplifier 78 may be provided which will correspond to the outdoor air temperature as sensed by temperature sensor 74. By proper selection of the resistors 76 and 80, the current imbalance may be made zero at any desired temperature, which may be chosen as the heat set point temperature. The voltage output from amplifier 78 will vary in accordance with the product of the current imbalance times the resistance of variable resistor 82. With resistor 82 set at a zero position the output of amplifier 78 will always be zero. At other settings of resistor 82, the output voltage will vary directly as outdoor temperature but at a modified level. The variable resistor 82 is adjusted to the K-Factor for the room as indicated on dial 83. Thus, the current flowing through resistor 84 to the inverting input of amplifier 30 will correspond to the outside air temperature and the K-Factor setting of the variable resistor 82.

Thus, the present invention automatically shifts the temperature control point in accordance with the outdoor temperature and the K-Factor for the particular room so that as outside air temperature falls, additional heat is provided to the room to prevent a drop in room temperature. In like manner, the invention prevents a significant heat rise in a room as a result of heat being transferred into the room through the walls during hot outside temperature conditions.

Another variable that may cause an uncomfortable change in the room temperature is the introduction of outside ventilation air which is required by various state and municipal codes. When the outside air is cold, the ventilation air causes a temperature droop and a rise in temperature is experienced when the outside air is hot. This effect may be included in the calculation of the K-Factor by the architect if the minimum percentage of outside air required by the local code is known in advance. In many instances, the minimum percentage of outside air as specified in a local code is not known in advance; therefore, it is desirable to provide an easy adjustment to correct for the amount of outside air brought into a room. Compensation for varying minimum outside air requirements may be provided by a circuit that is a duplicate of the compensation circuitry 72 shown in FIG. 3. In such a circuit, variable resistor 82 would be calibrated in units corresponding to minimum ventilation air percentages so that it may be set for the local code requirements for minimum percentage of ventilation air such as 0% to 50% minimum outside air.

Thus, the present invention provides a temperature control system that maintains a constant room temperature by compensating for heat transfer through the walls of the room due to differentials between indoor and outdoor temperatures. The present invention maintains the room temperature within the comfort range of most humans, while allowing the heating and cooling set points to be adjusted to the extreme ends of the comfort range thereby conserving the maximum amount of energy possible. The present invention is particularly effective in that it provides an adjustment so that each temperature controller exactly matches the heat transfer characteristics of a particular room. By making a simple one-time adjustment, the temperature control system may be uniquely tailored to the requirements of a particular room so that the effect of heat transfer through the walls is entirely compensated for.

While the principles of this invention have been described above in connection with specific apparatus, it is to be understood that this description is made only by way of example and not as a limitation on the scope of the invention as set forth in the objects and features thereof and in the accompanying claims.

What is claimed is:

1. A system adapted for use in controlling the temperature of an environment within an enclosure, comprising:
    means for selecting a temperature set point for said environment and for initiating a temperature control signal when the temperature of the environment is at a temperature control point; and
    means for automatically shifting the temperature control point in accordance with the ambient temperature and a K-Factor of the enclosure, whereby the system may be adjusted to automatically compensate for the heat transfer characteristics of a particular enclosure in which it may be used thereby eliminating an excessive environmental temperature change before heating or cooling is called for.

2. A system as described in claim 1, wherein the means for automatically shifting the temperature control point includes means for selecting a K-Factor.

3. A system as described in claim 1, wherein the means for automatically shifting the temperature control point includes:
    means responsive to ambient temperature for providing a signal corresponding thereto;
    means for modifying said signal in accordance with the K-Factor; and
    means responsive to said modified signal for shifting the temperature control point.

4. A system as described in claim 3, wherein the means for modifying said signal includes means for selecting a K-Factor.

5. A system as described in claim 3, wherein the means responsive to ambient temperature provides an electrical signal and the modifying means comprises an adjustable resistor.

6. A system as described in claim 3, wherein the means responsive to ambient temperature provides an electrical signal and the modifying means comprises a potentiometer means.

7. A system as described in claim 3, wherein the means responsive to ambient temperature includes a thermistor.

8. A system as described in claim 3, wherein the means for selecting a temperature set point includes a bimetal element, the means responsive to ambient temperature provides an electrical signal and the means responsive to said modified signal comprises a heating element disposed in proximity with said bimetal element so that the bimetal element is heated in accordance with the ambient temperature and the K-Factor.

9. A system as described in claim 3, wherein the means for selecting a temperature set point provides a signal corresponding to the difference between the set point temperature and the temperature of the environment and the means for automatically shifting the temperature control point additionally includes means for summing the difference signal and the modified signal, the means responsive to said modified signal also being responsive to the difference signal.

10. A system as described in claim 1, wherein the means for selecting a temperature set point provides a signal corresponding to the difference between the set point temperature and the temperature of the environment and the means for automatically shifting the temperature control point provides a signal corresponding to the ambient temperature and the K-Factor, said system additionally comprising:
 means for combining the difference signal and the signal corresponding to the ambient temperature and K-Factor; and
 means responsive to said combined signal to establish a desired temperature and thereafter stabilize the heat transfer to and from the environment.

11. A controller adapted for controlling a temperature control system of the type used to control the temperature of an environment within an enclosure comprising:
 means for selecting a temperature set point for said system and for initiating a temperature control signal when the temperature of the environment is at a temperature control point; and
 means for automatically shifting the temperature control point in accordance with the ambient temperature and a K-Factor of the enclosure, whereby the system may be adjusted to automatically compensate for the heat transfer characteristics of a particular enclosure in which it may be used thereby eliminating an excessive environmental temperature change before heating or cooling is called for.

12. A controller as described in claim 11, wherein the means for automatically shifting the temperature control point includes means for selecting a particular K-Factor.

13. A controller as described in claim 11, wherein the means for automatically shifting the temperature control point includes:
 means responsive to ambient temperature for providing a signal corresponding thereto;
 means for modifying said signal in accordance with the K-Factor; and
 means responsive to said modified signal for shifting the temperature control point.

14. A controller as described in claim 13, wherein the means for modifying said signal includes means for selecting a K-Factor.

15. A controller as described in claim 13, wherein the means responsive to ambient temperature provides an electrical signal and the modifying means comprises an adjustable resistor.

16. A controller as described in claim 13, wherein the means responsive to ambient temperature provides an electrical signal and the modifying means comprises a potentiometer means.

17. A controller as described in claim 13, wherein the means responsive to ambient temperature includes a thermistor.

18. A controller as described in claim 13, wherein the means for selecting a temperature set point includes a bimetal element, the means responsive to ambient temperature provides an electrical signal and the means responsive to said modified signal comprises a heating element disposed in proximity with said bimetal element so that the bimetal element is heated in accordance with the ambient temperature and the K-Factor.

19. A controller as described in claim 13, wherein the means for selecting a temperature set point provides a signal corresponding to the difference between the set point temperature and the temperature of the environment and the means for automatically shifting the temperature control point additionally includes means for summing the difference signal and the modified signal, the means responsive to said modified signal also being responsive to the difference signal.

20. A controller as described in claim 11, wherein the means for selecting a temperature set point provides a signal corresponding to the difference between the set point temperature and the temperature of the environment and the means for automatically shifting the temperature control point provides a signal corresponding to the ambient temperature and the K-Factor, said system additionally comprising:
 means for combining the difference signal and the signal corresponding to the ambient temperature and K-Factor; and
 means responsive to said combined signal to provide a control signal to a temperature control system.

21. A controller for controlling a temperature control system of the type used to control the temperature of an environment within an enclosure, comprising:
 means for automatically shifting the temperature at which a temperature control signal is initiated in accordance with the ambient temperature and a K-Factor of the enclosure, whereby the system automatically compensates for heat transferred through the enclosure walls.

22. A system as described in claim 1, additionally comprising means responsive to the temperature control signal for maintaining the temperature of the environment at approximately the set point temperature.

* * * * *